United States Patent [19]
Okaya et al.

[11] Patent Number: 5,774,384
[45] Date of Patent: Jun. 30, 1998

[54] KEYBOARD WITH ELEVATABLE KEYS

[75] Inventors: Ken Okaya; Stephen Burke; John Busch, all of Austin, Tex.

[73] Assignee: Dell, U.S.A., L.P., Austin, Tex.

[21] Appl. No.: 571,381

[22] Filed: Dec. 13, 1995

[51] Int. Cl.$^6$ ........................................................ G06F 1/16
[52] U.S. Cl. ........................ 364/708.1; 341/22; 400/488; 364/709.1
[58] Field of Search ............................ 364/708.1, 709.01; 341/22; 400/488, 494

[56] References Cited

U.S. PATENT DOCUMENTS

| | | | |
|---|---|---|---|
| 5,067,834 | 11/1991 | Szmanda et al. | 361/680 |
| 5,318,367 | 6/1994 | Braun et al. | 400/488 |
| 5,439,304 | 8/1995 | Phillips et al. | 400/488 |
| 5,490,037 | 2/1996 | Clancy | 361/680 |
| 5,543,787 | 8/1996 | Karidis et al. | 341/22 |
| 5,602,715 | 2/1997 | Lempicki et al. | 361/680 |
| 5,610,602 | 3/1997 | Hargreaves | 400/488 |
| 5,635,928 | 6/1997 | Takagi et al. | 341/22 |
| 5,646,817 | 7/1997 | Manser et al. | 361/680 |

*Primary Examiner*—David H. Malzahn
*Attorney, Agent, or Firm*—Haynes and Boone, L.L.P.

[57] ABSTRACT

A keyboard having a base and first and second demi-boards, which demi-boards include respective first and second key arrays. The first demi-board is supported in the base, and the second demi-board is supported in a variable elevation relative to the base. The elevation of the second demi-board may be selectively varied between a first elevation in which the first and second key arrays are substantially even relative to one another and a second elevation in which the first and second key arrays are substantially offset relative to one another. The second key array is operative in a first function mode when in the first elevation, and in a second function mode when in the second elevation. In one aspect, the second key array comprises first and second linked key rows, the second key row being moveable relative to the first key row so that the first and second key rows may be vertically aligned.

35 Claims, 4 Drawing Sheets

KEYBOARD WITH ELEVATABLE KEYS

TECHNICAL FIELD

The invention relates generally to a keyboard and, more particularly, to a keyboard in which particular keys may be selectively elevated.

BACKGROUND OF THE INVENTION

Keyboards are a critical component required for inputting data into computers. Because numerical data entries are very common, keyboards for desktop computers typically include a dedicated numeric keypad, set apart from other keys. Unlike other keys on a typical keyboard, the keys of such a dedicated keypad are also vertically aligned to further facilitate input. Due to the space constraints, however, it is not practical to provide portable personal computers (PCs), i.e., "laptop" or "notebook" computers, with such dedicated numeric keypads. This is a drawback with notebook computers because there is a strong demand by users for a separate keypad dedicated to the entry of numeric data.

One partial solution to this drawback is to enable particular notebook computer keys, normally operable in one mode for the entry of alphabetic data, to be operable in an alternate mode for the entry of numeric data.

The mode in which the keys are to be operable is then selected by the user upon the depression of a toggle key such a "Num Lock" key. While such "dual mode" keys, in the alternate mode, may resemble a numeric keypad, they are embedded in the keyboard with the other keys. Moreover, because the keys are so embedded, they are not vertically aligned as they are with a dedicated numeric keypad. Therefore, if the user is not careful when entering numerical data and does not watch which keys are depressed, non-numeric keys may be inadvertently depressed. Moreover, it would be difficult for the user to depress such embedded number keys based merely on the tactile feel of the keys.

Therefore, what is needed is a keyboard, compatible with the space constraints of a notebook computer, in which numerical data entry keys are readily accessible and may be identified by touch, thereby enabling the user to easily enter numerical data without inadvertently depressing a non-numerical key.

SUMMARY OF THE INVENTION

The present invention, accordingly, provides a keyboard apportioned between two demi-boards, one of which is elevatable relative to the other, that overcomes or reduces the disadvantages and limitations associated with prior keyboard designs.

In accordance with the present invention, a keyboard comprises a base and first and second demi-boards, which demi-boards include respective first and second key arrays. The first demi-board is supported in the base, and the second demi-board is supported in a variable elevation relative to the base. The elevation of the second demi-board may be selectively varied between a first elevation in which the first and second key arrays are substantially even relative to one another and a second elevation in which the first and second key arrays are substantially offset relative to one another. The second key array is operative in a first function mode when in the first elevation, and in a second function mode when in the second elevation.

In one aspect of the invention, a cam assembly is rotatably mounted between the base and the second demi-board for varying the elevation of the second demi-board. Alternatively, a ramp assembly is slidingly mounted between the base and the second demi-board for varying the elevation of the second demi-board.

In yet another aspect of the invention, the second key array comprises first and second linked key rows, the second key row being moveable relative to the first key row so that the first and second key rows may be vertically aligned when elevated.

A technical advantage achieved with the present invention is that the second key array, when elevated, provides enhanced accessibility to the user when numerical data is to be entered.

Another technical advantage achieved with the present invention is that, when the second key array is elevated, the location of each of the elevated keys is easy to gauge by touch, thereby alleviating the need for the user to look at the keyboard before a key is depressed.

Another technical advantage achieved with the present invention is that, when the second key array is vertically aligned, it substantially resembles a dedicated numeric keypad, thereby further facilitating utilization by a user familiar with a numeric keypad.

DETAILED DESCRIPTION OF THE PREFERRED EMBODIMENT

Figure 1:
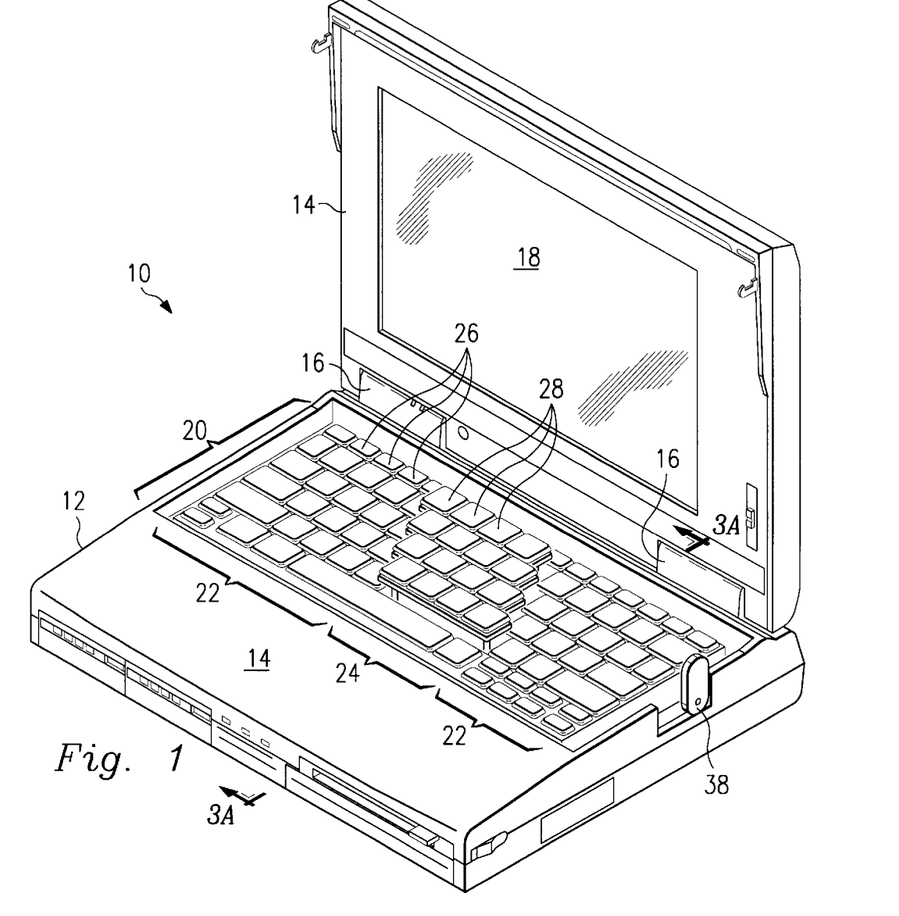
FIG. 1 is a perspective view of a notebook computer utilizing a keyboard assembly of the present invention.

In FIG. 1 the reference numeral 10 refers to a portable personal computer (PC) embodying features of a first embodiment of the present invention. The PC 10 includes a base 12 and a lid 14 connected by hinges 16 to the base 12. A display 18 is mounted in the lid 14 A keyboard assembly 20 is supported in the base 12. The keyboard assembly 20 comprises a fixed demi-board 22 and an elevatable demi-board 24 embedded within the fixed demi-board 22. Disposed on the demi-boards 22 and 24 are respective key arrays 26 and 28, the keys of which are depressible in a manner well known in the art for entering alphabetic and control data into the PC 10. In addition to alphabetic and control data, the key array 28 on the elevatable demi-board 24 may be alternatively and selectively utilized for the entry of numerical data into the PC 10, as described in detail below.

It is understood that ribbon cables (not shown) are provided for electrically connecting the demi-boards 22 and 24 to a keyboard controller 74 (FIG. 2), described below.

The fixed demi-board 22 is secured to the base 12 in a manner well known in the art. As described in greater detail below, the elevatable demi-board 24 is elevatably connected to the base 12 for elevational movement between a retracted position in which the key arrays 26 and 28 are at the same height to resemble a standard keyboard, and an elevated position in which the demi-board 24 is elevated above the fixed demi-board 22 and, accordingly, the key array 28 is raised above the key array 26.

Figures 2, 3A:
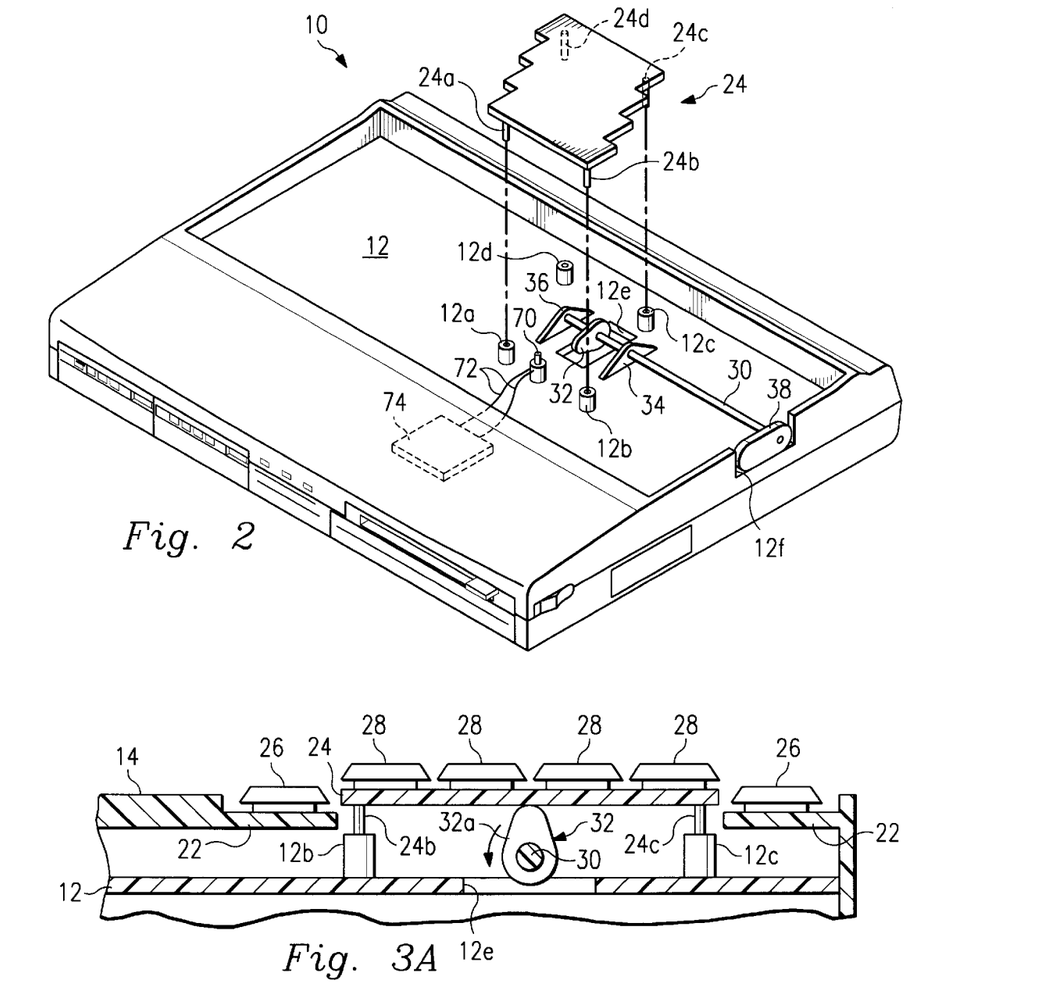
FIG. 2 is an exploded, partially broken-away, perspective view of the computer of FIG. 1 showing a portion of the keyboard assembly.
FIG. 3A is a side, elevational view, in partial cross section, of the keyboard assembly of FIG. 2, taken along the line 3A—3A of FIG. 1, showing keys in an elevated plane.

Referring to FIG. 2, four support bosses 12a, 12b, 12c, and 12d, having bores formed therein, extend perpendicularly and upwardly from the base 12. The elevatable demi-board 24 includes four legs 24a, 24b, 24c, and 24d which slidingly extend into the bores formed in corresponding bosses 12a, 12b, 12c, and 12d. Between the four bosses 12a, 12b, 12c, and 12d, an opening 12e is formed in the base 12. A shaft 30 having a cam 32 fixed thereto is rotatably mounted on the base 12 via two support structures 34 and 36 so that the cam 32 is centrally positioned over the opening 12e, which opening 12e serves to provide space for the cam. One end of the shaft 30 extends longitudinally through a cut-out 12f in a side wall of the base 12 and a lever arm 38 is attached thereto. The lever arm 38 is rotatable 90° between a horizontal first position in which the arm 38 is recessed in the cut-out 12f and the demi-board 24 is retracted, and a vertical second position in which the arm 38 is rotated upwardly (FIG. 1) and the demi-board 24 is elevated.

Figure 3B:
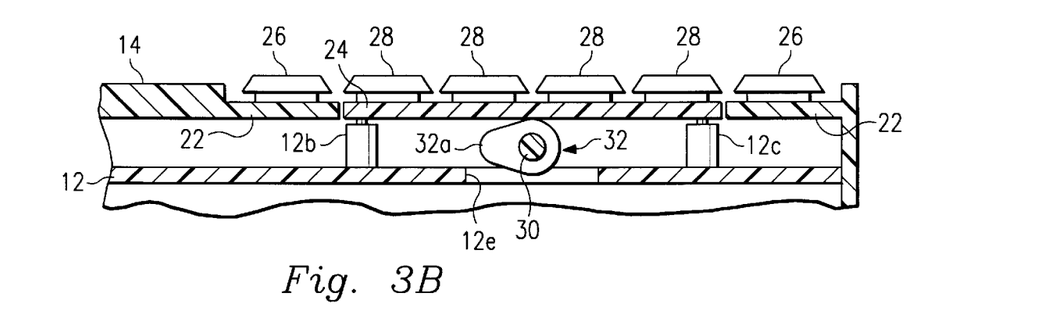
FIG. 3B is a side, elevational view, in partial cross section, of the keyboard assembly FIG. 2, showing keys in a retracted plane.

As depicted in FIGS. 3A and 3B, the cam 32 includes a toe portion 32a radially extending from the cam 32. The toe portion 32a is aligned with the arm 38, so that when the arm 38 is in the horizontal first position (FIG. 3B), the toe portion 32a does not engage or effect the demi-board 24, and so that when the arm 38 is in the vertical second position demi-board (FIG. 3A), the toe portion 32a engages and elevates the demi-board 24 above the fixed demi-board 22.

Figure 4:
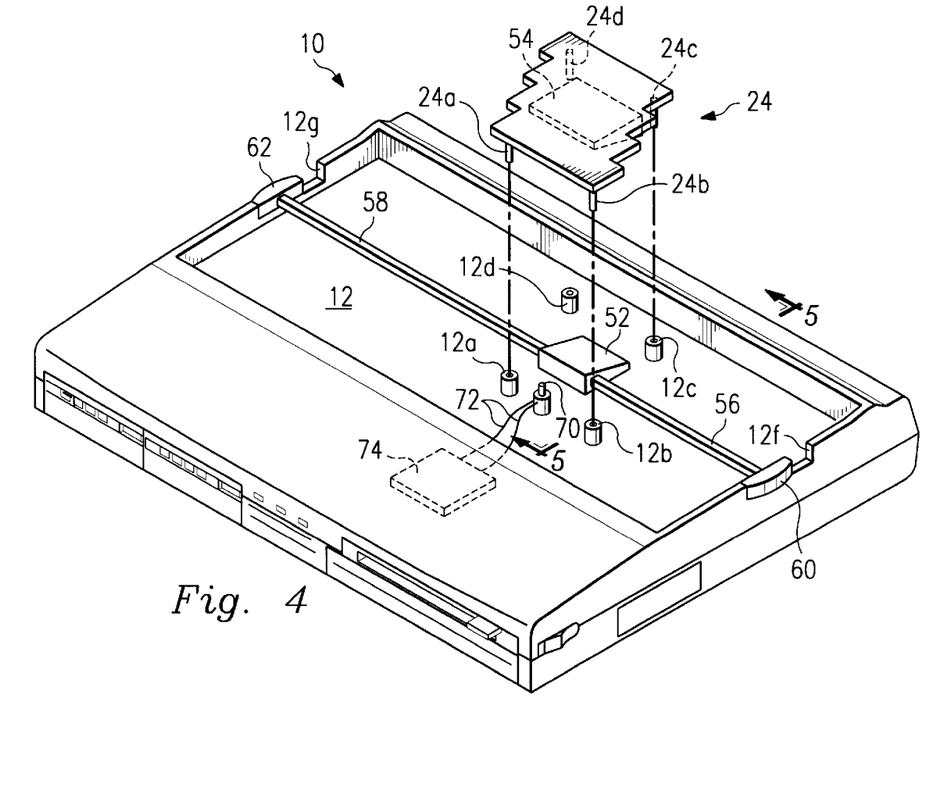
FIG. 4 is a perspective view of a second embodiment of the computer of FIG. 1.
Figure 5A:
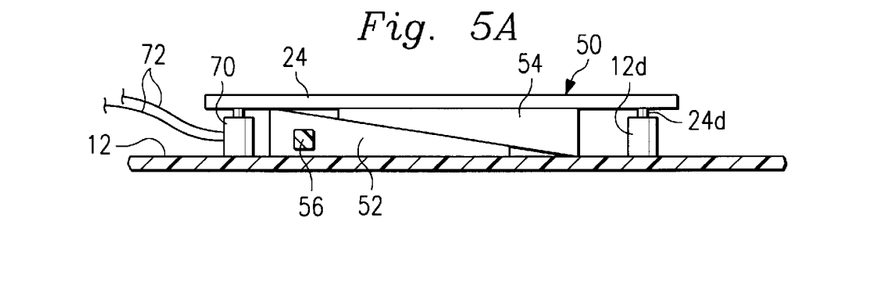
FIG. 5A is an elevational view of a ramp taken along the line 5—5 of FIG. 4, showing keys in an retracted position.
Figure 5B:
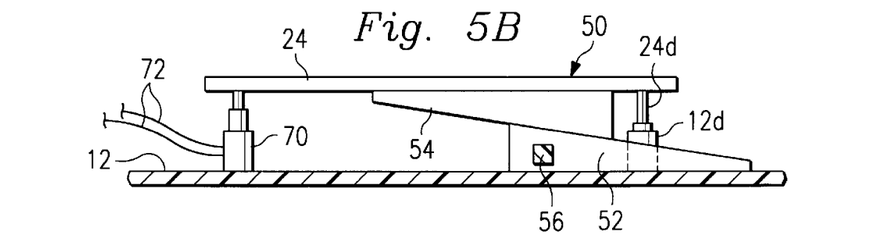
FIG. 5B is an elevational view of a ramp taken along the line 5—5 of FIG. 4, showing keys in a elevated position.

FIGS. 4, 5A, and 5B depict details of a keyboard assembly 20 according to a second embodiment of the present invention. Because the keyboard assembly 20 contains many components that are identical to those of the previous embodiment, these components are referred to by the same reference numerals and will not be described in any further detail.

According to the second embodiment of FIGS. 4, 5A, and 5B, the demi-board 24 is elevated using a ramp assembly 50, rather than the cam 32 previously described. The ramp assembly 50 includes a lower ramp 52 slidingly constrained to the base 12, and a corresponding mating upper ramp 54 mounted to the underside of the demi-board 24. Two shafts 56 and 58 are attached to opposing sides of the lower ramp 52 and extend through two cut-outs 12f and 12g, respectively, in opposing side walls of the base 12. Two slide actuators 60 and 62 are attached to the respective ends of the shafts 56 and 58. The actuators 60 and 62 are movable for effecting movement of the lower ramp 52 either toward or away from the upper ramp 54 and, accordingly, for elevating or retracting the demi-board 24 relative to the base 12, respectively.

Referring to FIGS. 2 and 4, in either of the foregoing embodiments, a depressible contact micro-switch 70 is integrated into the base 12 and is positioned therein so that it is depressed when the elevatable demi-board 24 is retracted therein, and is released when the demi-board 24 is elevated. The contact micro-switch 70, furthermore, is connected between two wires 72 which in turn are connected to a keyboard controller 74. The keyboard controller 74 interfaces the keyboards 22 and 24 to a central processing unit (CPU, not shown) of the PC 10. When the micro-switch 70 is depressed, contact is established between the lead wires 72, wherein, as explained below, the controller 74 causes the key array 28 to operate in its alphabetic (normal) function. Alternatively, when the micro-switch 70 is released by elevation of the demi-board 24, the controller 74 causes the key array 28 to operate in its numeric (alternative) function.

Figure 6:
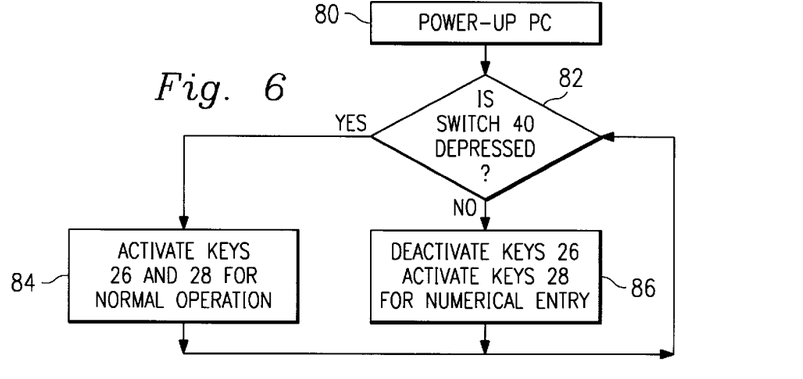
FIG. 6 is a flowchart illustrating control logic utilized in the present invention.

FIG. 6 is a flow chart illustrating control logic of the controller 74 for operating the keyboard assembly 20 in accordance with either of the foregoing embodiments of the present invention. It is understood that the logic may be implemented by circuitry or software instructions stored in the keyboard controller 74. In step 80, the PC 10 is powered-up and, in step 82, a determination is made whether or not contact is established between the lead wires 72 by the micro-switch 70. If, in step 82, it is determined that such contact is made, and hence that the lever arm 38 is recessed and the elevatable demi-board 24 is retracted into the base 12, then execution proceeds to step 84, in which the controller 74 activates the key arrays 26 and 28 for normal operation as a standard keyboard. If, in step 82, it is determined that such contact is not established by the micro-switch 70, then execution proceeds to step 86, in which the controller 74 de-activates the key array 26 and activates the key array 28 for the entry of numerical data. Execution then returns to step 82.

The present invention, as described herein, has many advantages over the prior art. For example, the key array 28, which is normally embedded in the key array 26, may be elevated for greater accessibility to the user when alternate (e.g., numerical) data is to be entered. Furthermore, when the key array 28 is so elevated, the location of each of its keys is easier to gauge by touch, thereby alleviating the need for the user to look at the keyboard before a key is depressed. The deactivation of the key array 26 further alleviates the user's need to look at the keyboard when the key array 28 is elevated. By adopting the first embodiment utilizing the lever arm 38 described above, the lid 14 is prevented from being closed unless the demi-board is in its retracted position, thereby avoiding potential damage to the display screen 18 by the elevated key array 28.

FIGS. 7A–8B depict details of a keyboard assembly 120 according to a third embodiment of the present invention. Because the keyboard assembly 120 contains many components that are identical to those of the previous embodiments, these components are referred to by the same reference numerals and will not be described in any further detail.

Figure 7A:
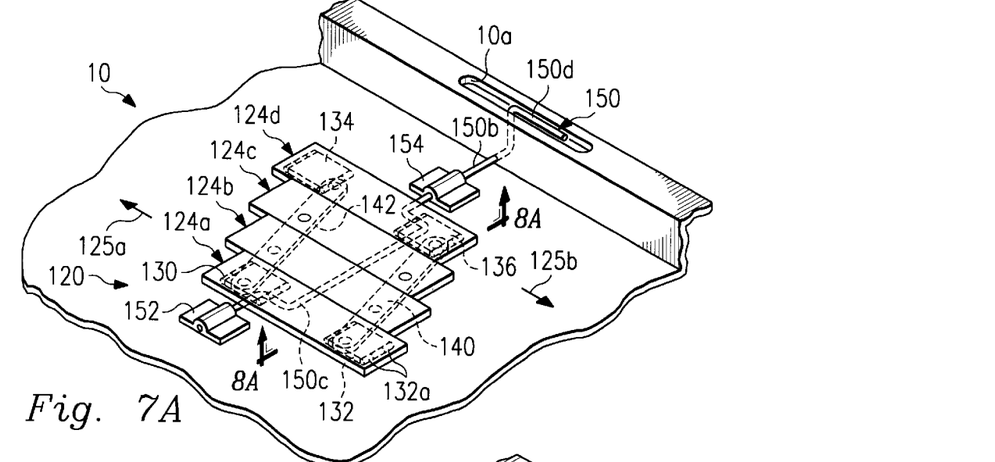
FIG. 7A is a perspective view of a partially broken-away portion of a computer utilizing a third embodiment of the keyboard assembly of the present invention, showing keys in a retracted position.
Figure 7B:
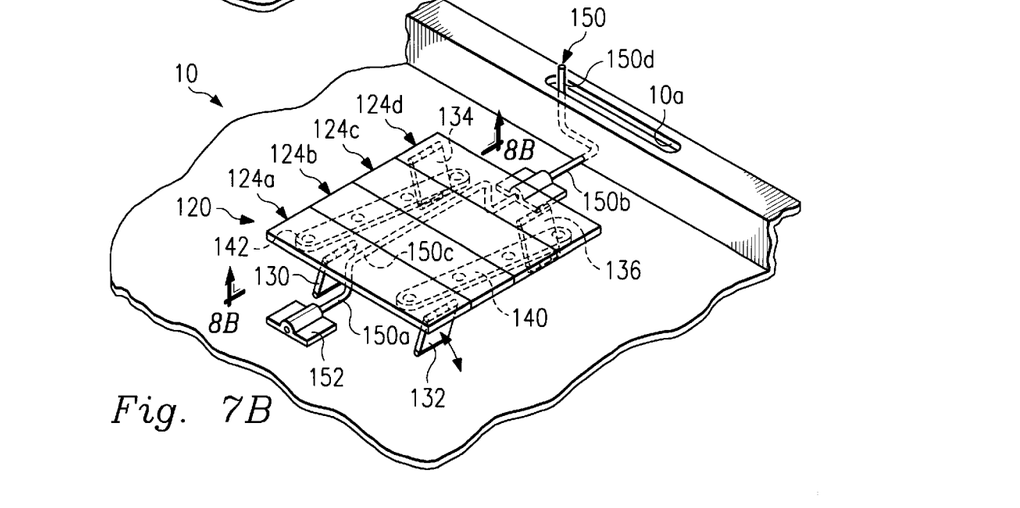
FIG. 7B is a perspective view of a partially broken-away portion of a computer utilizing a third embodiment of the keyboard assembly of the present invention, showing keys in an elevated position.

According to the third embodiment of FIGS. 7A and 7B, a second demi-board 124 is apportioned between four key rows 124a, 124b, 124c, and 124d, each of which have disposed thereon, a portion (not shown) of the second key array 28. The key row 124a is hingedly attached to the base 12 via hinge plates 130 and 132, which plates 130 and 132 are hingedly attached, at one end, to the base 12 and, at the other end, to barrel portions 130a and 132a disposed on the underside of the row 124a (FIGS. 8A and 8B) via hinge pins (not shown). Similarly, the key row 124d is hingedly attached to the base 12 via hinge plates 134 and 136, which plates 134 and 136 are hingedly attached, at one end, to the base 12 and, at the other end, to barrel portions 134a and 136a disposed on the underside of the row 124d (FIGS. 8A and 8B) via hinge pins (not shown). The hinges 130, 132, 134, and 136 may assume, between the base 12 and the key rows 124a and 124d, a horizontal first position (FIG. 7A) in which the key rows 124a, 124b, 124c, and 124d are retracted, and a nearly vertical second position (FIG. 7B) in which the key rows 124a, 124b, 124c, and 124d are elevated. It is noted that, as viewed in FIGS. 7A and 7B, when elevating the demi-board 124, the hinge plates 130 and 132 rotate counter-clockwise, and the hinge plates 134 and 136 rotate clockwise to bring the key rows 124a, 124b, 124c, and 124d into vertical alignment, as will be described.

Figure 8A:
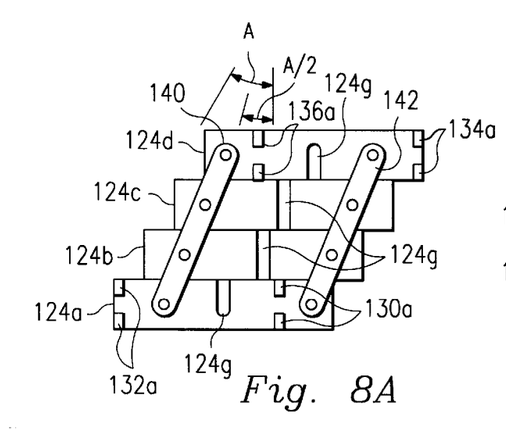
FIG. 8A is a bottom view of a demi-board taken along the line 8A—8A of FIG. 7A.
Figure 8B:
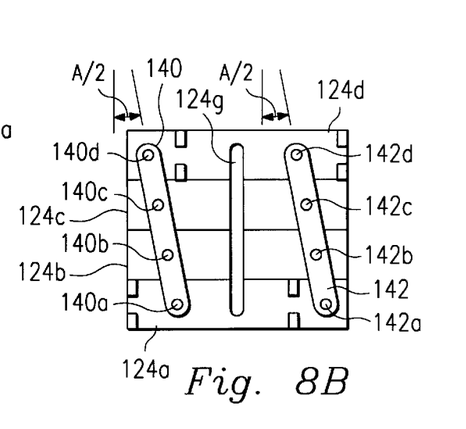
FIG. 8B is a bottom view of a demi-board taken along the line 8A—8A of FIG. 7B.

As shown in the bottom views of FIGS. 8A and 8B, the key rows 124b and 124c are interconnected to the key rows 124a and 124d, on the undersides thereof, by two linkages 140 and 142. Each of the key rows 124a, 124b, 124c, and 124d is pivotably connected to the linkage 140 at pivot points 140a, 140b, 140c, and 140d, respectively, and to the linkage 142 at the pivot points 142a, 142b, 142c, and 142d, respectively. It is understood that, while the pivot points are located approximately at the lateral center of the respective key rows 124a, 124b, 124c, and 124d, they may be located off-center as appropriate to account for the key rows 124a, 124b, 124c, and 124d being unequally offset, longitudinally, as depicted in FIG. 8A. As viewed in FIG. 8A, the key rows 124a, 124b, 124c, and 124d are typically offset from each other by an angle of A, such as 20°, from vertical. The linkages 140 and 142 are then offset by an angle of A/2, such as 10°, from vertical. As viewed in FIG. 8B, when the demi-board 24 is elevated, the key rows 124a, 124b, 124c, and 124d are brought into vertical alignment with one another and the linkages 140 and 142 are offset, in the opposite direction as that shown in FIG. 8A, by an angle of A/2, such as 10°, from vertical. When vertically aligned, a lateral depression 124g is, for reasons to be described, formed across the underside of the key rows 124a, 124b, 124c, and 124d (FIG. 8B), which depression 124g is fragmented when the key rows 124a, 124b, 124c, and 124d are not so aligned (FIG. 8A).

Referring to FIGS. 7A and 7B, a lifter 150 is shown rotatably mounted, via two mounts 152 and 154, to the base 12 for elevating the demi-board 124. As best shown in FIG. 7B, the lifter 150 includes shaft portions 150a and 150b which extend through the mounts 152 and 154, respectively. A radially offset portion 150c is formed between the shaft portions 150a and 150b. A bent arm portion 150d extends from the lifter shaft portion 150b and, as shown in FIGS. 7A and 7B, extends through a portion of the PC 10 to an opening 10a formed therein for access by the user.

In operation, the user may rotate the bent arm portion 150d of the lifter 150 90° between a first position and a second position. In the first position, shown in FIG. 7A, the offset portion 150c rests on the floor of the base 12, thereby permitting the demi-board 124 to be retracted. In the second position, shown in FIG. 7B, the offset portion 150c is raised, i.e., rotated 90° from the first position, to elevate and support the demi-board 124. As the demi-board 124 is elevated from the retracted position shown in FIG. 7A to the elevated position shown in FIG. 7B, the hinge plates 130 and 132 rotate counter-clockwise to cause the key rows 124a and 124b to shift left (i.e., in the direction of an arrow 125a), and the hinge plates 134 and 136 rotate clockwise to cause the key rows 124c and 124d to shift right (i.e., in the direction of an arrow 125b), until the key rows 124a, 124b, 124c, and 124d are brought into vertical alignment. When so aligned, the offset portion 150c of the lifter 150 seats in the depression 124g (FIG. 8B) formed by the alignment to thereby maintain the raised orientation of the offset portion 150c, and thus also the vertical alignment of the key rows 124a, 124b, 124c, and 124d, until the lifter 150 is rotated back to the first position.

It can be appreciated that the demi-board 124 may be retracted from the elevated position by rotating the bent arm portion 150d of the lifter 150 to the first position (FIG. 7A), during which rotation the key rows 124a, 124b, 124c, and 124d slide to the offset position shown in FIGS. 7A and 8A and become embedded within the fixed demi-board 22 to resemble a standard keyboard. It can be further appreciated that, to facilitate retraction of the demi-board 24, the hinge portions 130, 132, 134, and 136 are sized so that when the offset portion 150c is raised, the hinge portions 130, 132, 134, and 136 do not become fully vertical (i.e., perpendicular to the base 12). When the demi-board 124 is then retracted, the hinge portions 130, 132, 134, and 136 are biased to rotate in the appropriate direction to resume their horizontal position (FIG. 7A).

It is understood that, while not shown in FIGS. 7A or 7B, the switch 70 is positioned, as in the first two embodiments, on the base 12 to detect whether the demi-board 124 is retracted or elevated and, accordingly, for generating a signal to the keyboard controller 74. The activation of the keys and the operational logic implemented in the keyboard controller 74 are as described above with respect to FIG. 6.

The foregoing third embodiment includes many advantages in addition to those enumerated above with respect to the first two embodiments. For example, the keys of the second key array 128 on the demi-board 124 are vertically aligned, thereby further facilitating use of second key array 128, when elevated, as a standard 10-key pad. As a consequence of using the hinges 130, 132, 134, and 136, the demi-board 124 receives greater, more precise elevation and support than is provided in the first two embodiments because the key rows 124a and 124d will inherently always be parallel to the base 12 and the linkages 140 and 142, together with the lifter 150, ensure that the key rows 124b and 124c are parallel to and co-planar with the key rows 124a and 124d. Because the hinges 130, 132, 134, and 136 fold down, they are more compact than the bosses 12a, 12b, 12c, and 12d. The hinges 130, 132, 134, and 136 also inherently limit the elevation of the demi-board 124 more than the bosses 12a, 12b, 12c, and 12d limit the elevation of the demi-board 24. The lifter 150 is easier to manufacture, is lighter, and is more compact than either a cam or a ramp assembly. The lifter 150 also obviates the need for the opening 12e required with the cam 32. It is noted, too, that the upward extension of the arm 150d in the second position (FIG. 7A) prevents closure of the lid 14 onto the elevated demi-board 124, thereby preventing potential damage to the display 18.

It is understood that the present invention can take many forms and embodiments. The embodiments shown herein are intended to illustrate rather than to limit the invention, it being appreciated that variations may be made without departing from the spirit or the scope of the invention. For example, the key array 28 may be elevated utilizing alternative structures, such as one or more cams arranged on the shaft 30 or on multiple such shafts, which multiple shafts may be linked together, to provide greater support of the demi-board 28 when it is elevated. The shaft 30 may be replaced by a plate that lies horizontally between the base 12 and the demi-board 24, but, when rotated 90°, elevates and supports the demi-board 24 in an elevated position, thereby not only obviating the need for the opening 12e, the shaft 30, and the cam 32, but also further simplifying the manufacture thereof, conserving valuable space in the notebook computer 10, and minimizing the weight increase of the computer 10. The shaft 30 may be operated by a knob rather than the lever arm 38. The ramp 50 may be moved by the shaft 30 and the cam 32, or by a cable and pulley arrangement in which cable is wrapped around a shaft rotatable by the user. The elevatable demi-board 24 or 124 may be elevated and supported by springs, or held in a retracted position, by a rachet mechanism. The demi-board 24 may be connected to the base 12 via a scissor arrangement. In a scissor arrangement, the key rows may also be aligned when elevated. A tooth may be incorporated into the cam 32 for riding in a corresponding angular groove formed on the underside of a sliding key row of the demi-board 24 as the cam is rotated, thereby shifting and aligning the key rows as the demi-board 24 is elevated. If sliding key rows are utilized, then the foregoing plates or shafts used to elevate them may be vertically oriented so that each of the key rows is more fully supported as in the third embodiment. Sliding key rows may be facilitated in the first two embodiments by appropriately angling the bosses 12a–12d and the legs 24a–24d for bringing the key rows into alignment when elevated. In the third embodiment, the plates 130–136 may be replaced with rings. The key array 28 may comprise any combination and number of contiguous or spaced apart keys, at any location of the keyboard. Additionally, the keys in the elevated position may be utilized for any alternative function distinguishable from the function of the remaining keys, and the invention is not necessarily limited to distinguishing between alphabetic and numeric functions. Also, the switch 70 may be logically ORed with the "Num Lock" key in the keyboard controller 74.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A keyboard assembly, comprising:
    a base;
    a first demi-board comprising a first key array, said first demi-board supported in a first plane relative to said base;
    a second demi-board comprising a second key array, said second demi-board supported in the first plane and movable to a second plane parallel to the first plane and elevated relative to said base; and
    an elevator device for selectively moving said second demi-board in a direction orthogonal to the first and second planes between the first plane in which said first and second key arrays are substantially even relative to one another and the second plane in which said first and second key arrays are vertically offset relative to one another.

2. A keyboard assembling comprising;
    a base:
    a first demi-board comprising a first key array, said first demi-board supported in a fixed elevation relative to said base;
    a second demi-board comprising a second key array, said second demi-board supported in a variable elevation relative to said base; and
    an elevator device for selectively varying said second demi-board elevation between a first elevation in which said first and second key arrays are substantially even relative to one another and a second elevation in which said first and second keys arrays are substantially offset relative to one another;
    wherein said second key array comprises first and second key rows, said second key row being moveable relative to said first key row, and said keyboard assembly further comprises means for aligning said first and second key rows when said second demi-board is in said second elevation.

3. The keyboard assembly of claim 2, wherein said aligning means comprises:
    first plates, each of which have a first end hingedly attached to said base and a second end hingedly attached to said first key row; and
    second plates, each of which have a first end hingedly attached to said base and a second end hingedly attached to said second key row, said first and second plates being hinged for rotation in opposing directions so that said first and second rows move in opposite directions when the elevation thereof is varied thereby facilitating alignment of said first and second key rows.

4. The keyboard assembly of claim 3 wherein said second key array further comprises a third key row interposed between said first and second key rows, said third key row being moveable relative to said first and second key rows, and said aligning means further comprises linkage pivotably connecting said first, second, and third key rows so that an offset between said first and second key rows is substantially similar to an offset between said second and third key rows.

5. The keyboard assembly of claim 2 wherein said elevator device comprises a cam assembly.

6. The keyboard assembly of claim 5 wherein said cam assembly comprises:
    a shaft rotatably mounted on said base;
    a cam fixed to said shaft; and
    means for rotating said shaft between a first angular orientation in which said second demi-board is disposed in said first elevation, and a second angular orientation in which said cam engages and elevates said second demi-board to said second elevation.

7. The keyboard assembly of claim 6 wherein said cam includes a tooth extending radially therefrom, said second key array comprises first and second linked key rows, and said first key row includes an angled groove for matingly engaging said tooth so that, when said cam is rotated, said tooth moves in said groove to cause said first key row to shift relative to said second key row until said first and second key rows are aligned.

8. The keyboard assembly of claim 6 wherein said rotating means comprises a lever attached to one end of said shaft and extending outwardly therefrom.

9. The keyboard assembly of claim 2 wherein said comprises a ramp assembly.

10. The keyboard assembly of claim 9 wherein said ramp assembly comprises:

a first ramp slidably supported on said base;

a second ramp secured to said second demi-board; and means for sliding said first ramp on said base between a first position in which said first ramp does not engage said second ramp, and a second position in which said first ramp slidingly engages and bears against said second ramp to cause said second demi-board to move to said second elevation.

11. The keyboard assembly of claim 10 wherein said sliding means comprises a shaft extending from said ramp for movement by the user.

12. The keyboard assembly of claim 10 wherein said elevator device comprises a shaft with an offset portion, said offset being rotatable about said shaft for varying the elevation of said second demi-board between said first and second elevations.

13. The keyboard assembly of claim 2 further comprising a keyboard controller operatively connected to said first and second key arrays for controlling the function modes of said keys, such that said second key array is operative in a first function mode in said first elevation and in a second function mode in said second elevation.

14. The keyboard assembly of claim 13, further comprising means for determining whether said second demi-board is in said first elevation or in said second elevation; and wherein said keyboard controller comprises:

logic, executable by said controller in response to a determination that said second demi-board is in said first elevation, for generating, in response to the depression of one of said keys of said first or second key arrays, a first signal to a CPU indicative of which key is depressed; and logic, executable by said controller in response to a determination that said second demi-board is in said elevated position, for deactivating said first key array, and for generating, in response to the depression of a key of said second key array, a second signal to said CPU indicative of which key is depressed.

15. The keyboard of claim 14 wherein said determining means is a depressible switch positioned between said base and said second demi-board such that said switch is depressed when said second demi-board is in said first elevation and is not depressed when said demi-board is in said second elevation, said determining means further comprising electrical contacts connected to said controller, wherein said switch closes said contacts when depressed and opens said contacts when not depressed.

16. A computer having keys supported relative to a base, comprising:

a first demi-board comprising a first key array, said first demi-board supported in a first plane relative to said base;

a second demi-board comprising a second key array, said second demi-board supported in the first plane and movable to a second plane parallel to the first plane and elevated relative to said base;

an elevator device for selectively moving said second demi-board in a direction orthogonal to the first and second planes between the first plane in which said first and second key arrays are substantially even relative to one another and the second plane in which said first and second key arrays are vertically offset relative to one another; and a keyboard controller operatively connected to said first and second key arrays for rendering said second key array operative in a first function mode in said first plane and in a second function mode in said second plane.

17. A computer having keys supported relative to a base comprising:

a first demi-board comprising a first key array, said first demi-board supported in a fixed elevation relative to said base:

a second demi-board comprising a second key array, said second demi-board supported in a variable elevation relative to said base;

means for selectively varying said second demi-board elevation between a first elevation in which said first and second key arrays are substantially even relative to one another and a second elevation in which said first and second key arrays are substantially offset relative to one another;

a keyboard controller operatively connected to said first and second key arrays for rendering said second key array operative in a first function mode in said first elevation and in a second function mode in said second elevation; and said second key array comprises first and second key rows, said second key row being moveable relative to said first key row, and said computer further comprises means for aligning said first and second key rows when said second demi-board is in said second elevation.

18. The computer of claim 17, wherein said aligning means comprises:

first plates, each of which have a first end hingedly attached to said base and a second end hingedly attached to said first key row; and second plates, each of which have a first end hingedly attached to said base and a second end hingedly attached to said second key row, said first and second plates being hinged for rotation in opposing directions so that said first and second rows move in opposite directions when the elevation thereof is varied thereby facilitating alignment of said first and second key rows.

19. The computer of claim 18 wherein said second key array further comprises a third key row interposed between said first and second key rows, said third key row being moveable relative to said first and second key rows, and said aligning means further comprises linkage pivotably connecting said first, second, and third key rows so that a longitudinal offset between said first and second key rows is substantially similar to a longitudinal offset between said second and third key rows.

20. The computer of claim 17 wherein said first function mode is alphabetic and said second function mode is numeric.

21. The computer of claim 17 wherein said elevation varying means comprises:

a shaft rotatably mounted on said base;

a cam fixed to said shaft; and means for rotating said shaft between a first angular orientation in which said second demi-board is disposed in said first elevation, and a second angular orientation in which said cam engages and elevates said second demi-board to said second elevation.

22. The computer of claim 21 wherein said cam includes a tooth extending radially therefrom, said second key array comprises first and second linked key rows, and said first key row includes an angled groove for matingly engaging said tooth so that, when said cam is rotated, said tooth moves in said groove to cause said first key row to shift relative to said second key row until said first and second key rows are aligned.

23. The computer of claim 17 wherein said elevation varying means comprises:
   a first ramp slidably supported on said base;
   a second ramp secured to said second demi-board; and
   means for sliding said first ramp on said base between a first position in which said first ramp does not engage said second ramp, and a second position in which said first ramp slidingly engages and bears against said second ramp to cause said second demi-board to move to said second elevation.

24. The computer of claim 23 wherein said sliding means comprises a shaft extending from said ramp for movement by the user.

25. The keyboard assembly of claim 17 wherein said elevation varying means comprises a shaft with a radial offset portion, said offset being rotatable about said shaft for varying the elevation of said second demi-board between said first and second elevations.

26. The computer of claim 17, further comprising means for determining whether said second demi-board is in said first elevation or in said second elevation; and wherein said keyboard controller comprises:
   logic, executable by said controller in response to a determination that said second demi-board is in said first elevation, for generating, in response to the depression of one of said keys of said first or second key arrays, a first signal to a CPU indicative of which key is depressed; and
   logic, executable by said controller in response to a determination that said second demi-board is in said elevated position, for deactivating said first key array, and for generating, in response to the depression of a key of said second key array, a second signal to a CPU indicative of which key is depressed.

27. The keyboard of claim 26 wherein said determining means is a depressible switch positioned between said base and said second demi-board such that said switch is depressed when said second demi-board is in said first elevation and is not depressed when said demi-board is in said second elevation, said determining means further comprising electrical contacts connected to said controller, wherein said switch closes said contacts when depressed and opens said contacts when not depressed.

28. A computer having keys supported relative to a base, comprising:
   a first demi-board supported in a fixed elevation relative to said base, said first demi-board comprising a first key array;
   a second demi-board supported in a variable elevation relative to said base, said second demi-board comprising a second key array having first and second key rows, said second key row being moveable relative to said first key row;
   means for selectively varying said second demi-board elevation between a first elevation in which said first and second key arrays are substantially even relative to one another and a second elevation in which said first and second key arrays are substantially offset relative to one another;
   a keyboard controller operatively connected to said first and second key arrays for rendering said second key array operative in a first function mode in said first elevation and in a second function mode in said second elevation; and
   means for aligning said first and second key rows when said second key array is in said second elevation.

29. The computer of claim 28, wherein said second key array further comprises a third key row interposed between said first and second key rows, said third key row being moveable relative to said first and second key rows, and wherein said aligning means comprises:
   first plates, each of which have a first end hingedly attached to said base and a second end hingedly attached to said first key row;
   second plates, each of which have a first end hingedly attached to said base and a second end hingedly attached to said second key row, said first and second plates being hinged for rotation in opposing directions so that said first and second rows move in opposite directions when the elevation thereof is varied thereby facilitating alignment of said first and second key rows; and
   linkage pivotably connecting said first, second, and third key rows so that a longitudinal offset between said first and second key rows is substantially similar to a longitudinal offset between said second and third key rows.

30. The computer of claim 28 wherein said first function mode is alphabetic and said second function mode is numeric.

31. The computer of claim 28 wherein said elevation varying means comprises:
   a shaft rotatably mounted on said base;
   a cam fixed to said shaft; and
   means for rotating said shaft between a first angular orientation in which said second demi-board is disposed in said first elevation, and a second angular orientation in which said cam engages and elevates said second demi-board to said second elevation.

32. The computer of claim 31 wherein said cam includes a tooth extending radially therefrom, said second key array comprises first and second linked key rows, and said first key row includes an angled groove for matingly engaging said tooth so that, when said cam is rotated, said tooth moves in said groove to cause said first key row to shift relative to said second key row until said first and second key rows are aligned.

33. The computer of claim 28, wherein said elevation varying means comprises:
   a first ramp slidably supported on said base;
   a second ramp secured to said second demi-board; and
   a shaft extending from said ramp for sliding said first ramp on said base between a first position in which said first ramp does not engage said second ramp, and a second position in which said first ramp slidingly engages and bears against said second ramp to cause said second demi-board to move to said second elevation.

34. The keyboard assembly of claim 28 wherein said elevation varying means comprises a shaft with a radially offset portion, said offset being rotatable about said shaft for varying the elevation of said second demi-board between said first and second elevations.

35. The computer of claim 28, further comprising a switch operative for determining whether said second demi-board is in said first elevation or in said second elevation; and wherein said keyboard controller comprises:
   logic, executable by said controller in response to a determination that said second demi-board is in said first elevation, for generating, in response to the depression of one of said keys of said first or second key arrays, a first signal to a CPU indicative of which key is depressed; and logic, executable by said controller in response to a determination that said second demi-board is in said elevated position, for deactivating said first key array, and for generating, in response to the depression of a key of said second key array, a second signal to said CPU indicative of which key is depressed.

* * * * *